US008527357B1

(12) United States Patent
Ganesan

(10) Patent No.: US 8,527,357 B1
(45) Date of Patent: Sep. 3, 2013

(54) CLIENT AND SERVER SYSTEM FOR COORDINATING MESSAGING BETWEEN MOTIVATED BUYERS AND LISTED SELLERS

(76) Inventor: Venkat Ganesan, Fremont, CA (US)

(*) Notice: Subject to any disclaimer, the term of this patent is extended or adjusted under 35 U.S.C. 154(b) by 210 days.

(21) Appl. No.: 12/341,973

(22) Filed: Dec. 22, 2008

Related U.S. Application Data

(60) Provisional application No. 61/016,350, filed on Dec. 21, 2007.

(51) Int. Cl.
*G06Q 30/00* (2012.01)
(52) U.S. Cl.
USPC ........................................... 705/26.1
(58) Field of Classification Search
USPC .............................. 705/26, 27, 26.1
See application file for complete search history.

(56) References Cited

U.S. PATENT DOCUMENTS

| 2002/0046147 A1* | 4/2002 | Livesay et al. ............... 705/37 |
| 2002/0188503 A1* | 12/2002 | Banerjee et al. ............. 705/14 |
| 2003/0177277 A1* | 9/2003 | Dascalu ....................... 709/313 |
| 2005/0149410 A1* | 7/2005 | Livesay ....................... 705/26 |
| 2011/0106640 A1* | 5/2011 | Lotvin et al. ................. 705/26.1 |
| 2012/0158475 A1* | 6/2012 | Mesaros ....................... 705/14.15 |

* cited by examiner

*Primary Examiner* — Mila Airapetian

(57) ABSTRACT

An on-line venue in which buyers can anonymously communicate precisely what product or service they want to purchase by posting an interactive request that a number of sellers/service providers can then directly respond to according to one embodiment of the invention. Such embodiments may promote the buyers interests in directly matching their needs with qualified vendors. In contrast to what others provide, where the buyer has to search within each seller/service providers and then send their request. Embodiments of the present invention broadcast a buyer's needs to relevant/selected sellers/service providers. Such embodiments may take the burden from a buyer in finding the right products and services by self-qualifying the lead to proactive prospective sellers/service providers.

14 Claims, 16 Drawing Sheets

CLIENT AND SERVER SYSTEM FOR COORDINATING MESSAGING BETWEEN MOTIVATED BUYERS AND LISTED SELLERS

CROSS-REFERENCE TO RELATED APPLICATIONS

This application claims priority from U.S. Provisional Patent Application No. 61/016,350 filed Dec. 21, 2007 entitled "A Messaging System That Handles Online Buyer Motivated Listings and Related Messages" which is hereby incorporated by reference, as if set forth in full in this document, for all purposes.

BACKGROUND OF THE INVENTION

The present invention relates in general to a buyer motivated online marketplace and, but not by way of limitation, to an online marketplace where buyers may communicate needed products and services amongst other things.

BRIEF SUMMARY OF THE INVENTION

In one embodiment, the present disclosure provides for an on-line venue in which Buyers can anonymously communicate precisely what product or service they want to purchase by posting an interactive request that a number of Sellers/Service providers can then directly respond to. This embodiment may promote the Buyers interests in directly matching their needs with qualified vendors. In contrast to what others provide, where the Buyer has to search within each Seller/Service providers and then send their request. Embodiments of the present invention broadcast a Buyer's needs to selected/relevant Sellers/Service providers. Such embodiments may take the burden from a Buyer in finding the right products and services by self-qualifying the Lead to proactive prospective Sellers/Service providers.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

In one embodiment, the present disclosure provides for a Buyer motivated online market place according to one embodiment of the invention. A Buyer may approach a website, for example, at the URL http://R2B.com. R2B is abbreviated for Ready-to-Buy.

Figure 4:
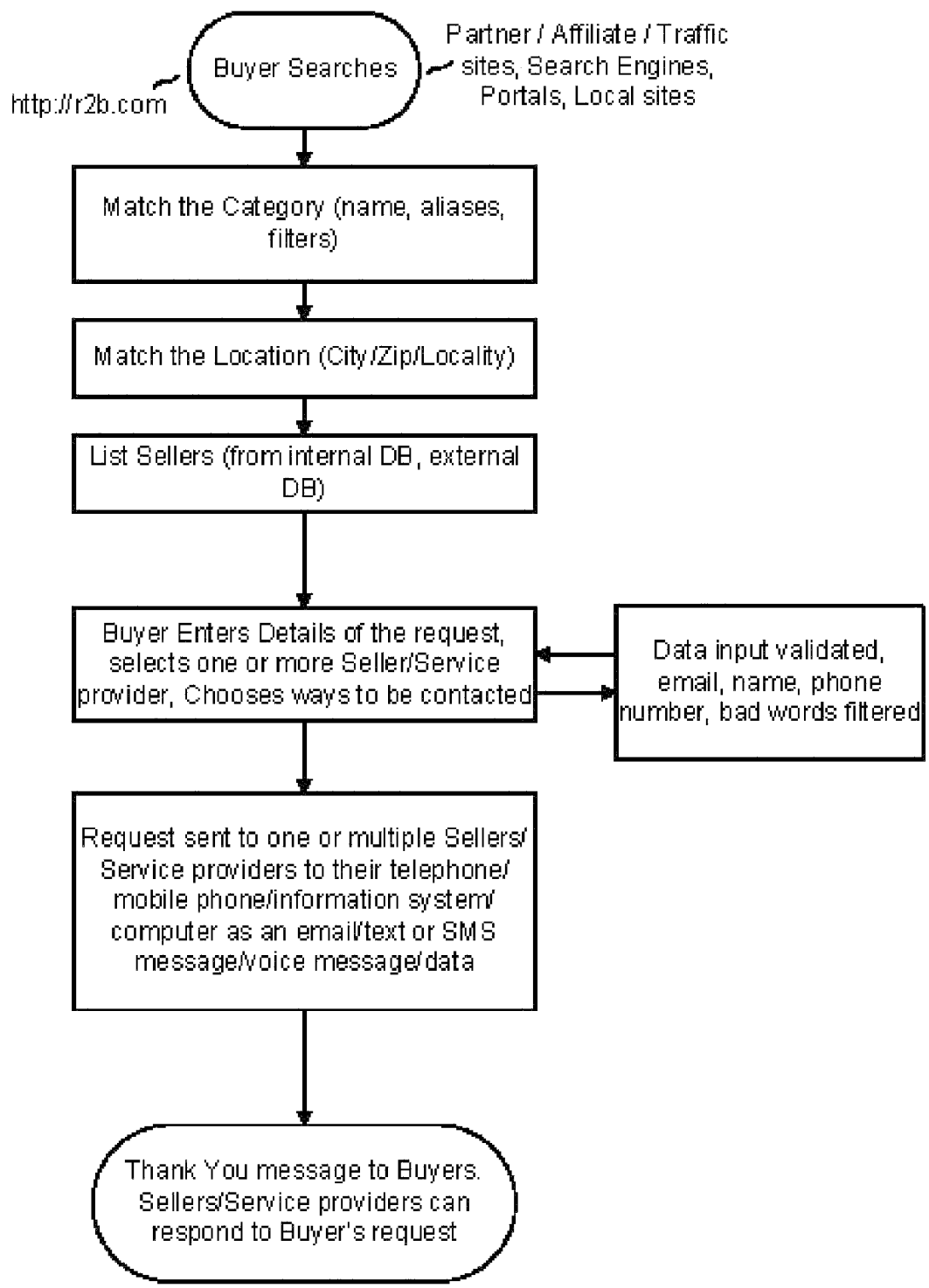

FIG. 4. At the website the Buyer may be presented with a search box where they can type their desired product or service. Alternate ways of getting data using voice recognition software or search requests from external sites may also be used. Using Asynchronous JavaScript and XML (AJAX) technology, website matches the categories and presents the user with a location where they desire the product or service FIG. 6. The website may also automatically identify the Buyer's location to the closest city or state using IP address mapping or from the location information from a mobile device. The user can manually enter or override the default choice. Using AJAX, the service minimizes the need for typing the entire word and presents the cities and localities that match FIG. 6. The Buyer can also enter a zip code or phone area code for location selection. The implementation however may not be limited to AJAX based.

Once the location is determined, a form that details information may be presented to the Buyer FIG. 4. The request form allows the Buyer to enter specific product or service features, parameters, options, terms, notes and various other information. The user can also specify the length of time in which they wish to post their request and how and by when they would like to be notified. For example, notifications to Sellers/Service providers and Buyers can be sent via email, SMS/Text/Voice message to a mobile phone 106, through a traditional telephone number to a regular telephone 110, through a posting on a web page, text to speech 121 FIG. 2, voice message, Instant Messaging, or any other communication/information systems comprised of VOIP (voice over IP) gateways 126 FIG. 2, Email servers 127 Text/SMS messaging systems 128.

The Buyer not necessarily but could register with R2B, select a user name, password and/or become uniquely identified for the next time they access the site/service after login. Once they are logged in their requests can be made without having to reenter their contact information.

When the request is posted, previously registered Sellers/Service providers or Sellers/Service providers listed in partner sites that match the request as selected by the Buyer are notified about the request. Once the Buyer and Seller/Service providers are matched, the business transaction can be handled independently or facilitated using R2B buying and selling services.

The website may have dynamic and/or static directory type listings. Static means information about the listing stays the same and applies to Sellers or Service providers. Dynamic means the listing information is applicable only for a short period of time. For example a static directory may include Attorneys, Auto repairs, Dentists, Florists, Garden supplies, Home improvement, Insurance, Locksmiths, Movers, Pest Control, Physicians, Plumbing, Painting, Roof repair, Limousines, Carpet Service, Handypersons, Housecleaning, Restaurants, Security, Storage, Vets, etc. A dynamic classified listing, for example, may include Antiques, Appliances, Art & Prints, Automotive, Business equipment, Building materials, Cameras/Video, Clothing, Collectibles, Computer equipment, Food & Recipes, Furniture, Musical Instruments, Sports Equipment, Tickets & Events, Personal Ads, Employment, Rentals, Real Estate, etc.

Various embodiments of the present invention may provide a number of benefits to a Buyer. For example, these embodiments eliminate the need for searching for needed products and services from several websites. Buyers can list their requirements and do not have to come back to the site each day to poll for possible Seller/Service providers listings. Within the time frame specified by the user, the search continues automatically and the user is notified when a match is found. As another exemplary benefit, searching for services may be easier with the click of a button without having to manually go through each printed yellow page or online listing of seller's phone number, calling each of them and repeating the same information. Moreover, using these embodiments of the invention, the power to shop now shifts to the Buyer with the ability to reach one or more of the listed Sellers/Service providers at once. The Buyer may be notified about a potential Seller/Service provider on mobile devices 106, 107, such as a mobile phone 106 or hand held computer 107. Buyers and Sellers/Service providers can instantly know of the responses to their listings. With the click of a button can make a call and can know more information or negotiate price.

Various embodiments of the present invention may provide a number of benefits to a seller. For example, Sellers/Service providers receive qualified Leads directly from seriously interested Buyers. Moreover, Sellers/Service providers don't have to display price but understand their Buyer's specific needs better and can negotiate with each, one on one. Also, the website can become a complimentary offering to partner Seller/Service provider's sites.

Embodiments of the invention may include any of the following features. A R2B online marketplace provides matching of Buyers and Sellers/Service providers. During a transaction or the Lead up to a transaction Buyers and Sellers/Service providers can remain anonymous through anonymous email/Voice/SMS or Text message relay FIG. 8. They can, of course, by agreement end the anonymous communications at anytime. A R2B online marketplace may also provide search and matching algorithms that pre qualifies a Buyer with a Sellers/Service providers. A R2B online marketplace may also allow Buyers to elect which Sellers/Service providers that can be contacted or sources to search for Sellers/Service providers.

Figure 6:
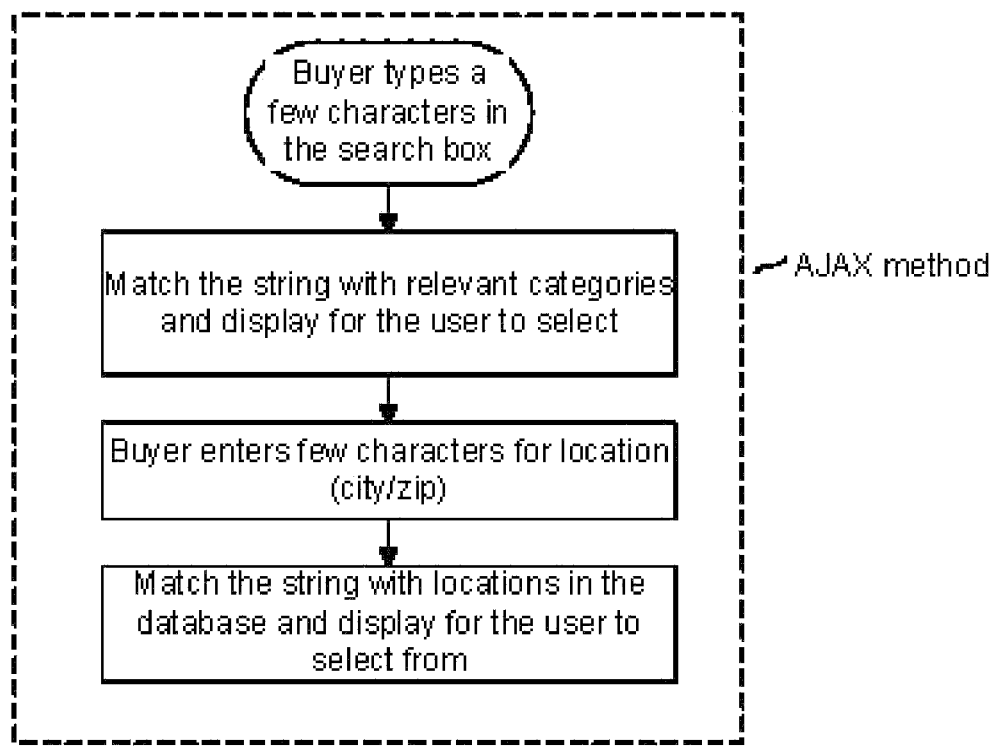

A R2B online marketplace, for example, may use AJAX technology FIG. 6, which may speed up processes of various embodiments of the invention and may improve the user interaction experience. Embodiments of the invention may be implemented at various steps from searching the category, displaying the form with location information to delivering the message, etc. The flow of information between the Buyer and the website may include, for example: Category partially entered>display category list>Category completely entered>display form>location entered>list Sellers/Service providers to who request will be sent>submit>send the request for each Seller/Service providers listed. Buyers may have their location mapped using IP address or location information enables automatic location selection.

Other exemplary features of the R2B online marketplace may include providing the site free to buyers, requiring Sellers/Service providers to pay a subscription to obtain information about a Buyer's request, etc. For example, requesting periodic subscriptions such as monthly or yearly subscriptions. The price for a subscription may vary based on location. Other subscriptions may require fees from the Seller/Service providers based on the number of transactions, the amount of a transaction, the number of notifications, or matches per cycle. Various sponsored messages may be sent within the email/Voice/SMS or Text messages sent to Buyers FIG. 2. The website may include advertisers that pay a fee for advertising within selective sections. These advertisements may include banners, sponsored links, related or featured items (sponsored), most popular products within category (sponsored), etc. A reward may be returned to the Buyer, as a percentage of the transaction, based on which, R2B gets a percent. Moreover, all transactions may be tracked by the website.

The Buyer motivated market place may be hosted on a web server 101, for example, an Apache web server 101 using SQL, PHP, JavaScript, AJAX technologies. An exemplary web site may include any of the following features either singularly or in combination:

Form parameters (structured and unstructured data input)—structured data refers to pre-created options and parameters about a product or service. Unstructured data input is any information about the Buyer's need that is entered, which is not already defined in the product.

Customized forms for specific locations and categories. The forms created in R2B under certain categories may not be applicable in all locations. Ex: they may not be using carpet for flooring in Mexico. R2B then creates customized local forms specific to certain locations and categories.

Static directory listings information about the business only—not a temporary product or service offering. Ex: yellow pages listings Dynamic classified listings information about product sale or special service offering—a listing that is only applicable for a short period of time. Ex: classified listings Localized search by location city/locality or zip Sellers/Service providers can list at multiple levels and Buyers can search at multiple levels ex: a workers compensation insurance business can list itself in the entire state vs. a local florist may only list to specific locality. Buyer can search only specific to the locality or an entire city. Matches will be made to local Sellers/Service providers and citywide/statewide/national Sellers/Service providers for that request. Zip code with radius matching is also a way to search and match the listings.

Mobile phone reach Voice/SMS/Text messaging to both Buyers and Sellers/Service providers instantly—Buyer's request is sent to Sellers/Service provider's mobile phones and they can connect back to the Buyers on their mobile devices and phones.

Alias list ex: cars and vehicles; an alias list provides several categories referred to by alternate names. Ex: Cars and Vehicles select Auto (multiple alias names can be added using the admin control for the category names. Ex: limos will also be matched when searched for limousines, airport shuttle, airport ride, stretch limos etc.)

When the Buyer moves the mouse input device over on a business name displays Seller/Service provider's information.

An Administrator is allowed access through web pages after authentication to create categories with form parameters and manage the information.

An Administrator is allowed access through web pages after authentication to add country, state, city, locality and zip code and manage the information.

Add your Business/Service listing: is available for Sellers/Service providers to add their listing. Sellers/Service providers can choose the options at various price levels ex: if they want Text/SMS/Voice messages, there is an extra price, or phone notification, pay a price per call. Nationwide listing will cost more than statewide, city wide or just local listing (cheapest price). These options can be selected. Price may also vary with filter options ex: an auto dealer who only sells one type of car and wants filtered Leads for that type will pay less than a dealer who sells more than one type of car and wants multiple filter results. The Administrator gets an email when a Seller/Service providers listing is added for validation purposes.

Geocoded IP address which determines the user location is used to match Sellers/Service providers using reverse zip code mapping and display.

Geocode (latitude and longitude) is used to calculate distance between the Buyer and Seller/Service providers to limit display of results based on radius input.

IP address to location matching is used to reduce the selection of cities to display. Example, when the user types S, there may be thousands of cities throughout the world. With IP address as an indicator, we search and match only results within that country or state from where that IP location originated.

GPS or cell triangulation based location information from PC and mobile devices is used for location mapping.

Memorized queries—Buyer requests are saved in our system for a selected amount of time to match Sellers/Service providers.

Responses mailbox—Buyer and Sellers/Service providers can choose the option of keeping their messages they got from the other in their R2B mailbox.

Anonymity and privacy options—anonymity is maintained at both the Buyer and Seller/Service provider sides when initiating contact or communicating through email/SMS/Voice/Text phone messages. Data entered by a Buyer is not displayed to anyone other than who the Buyer selected and not shared.

Instant messaging (IM) to communicate—Buyer requests can be sent to web based chat and instant messaging systems whereby Sellers/Service providers can respond instantly over the chat/instant messaging interface.

General help and user notes for each category—Buyers can write helpful comments suggestions and relevant useful information for each category in general.

Click-to-Call from mobile phones from the message to Buyer/Seller/Service provider—Buyers and Sellers/Service providers can initiate a call to the number of the other party, from their email/SMS/Text/Voice message.

Click-to-chat text IM or voice IM on a Seller/Service provider listing—to individual Sellers/Service providers—Buyers can initiate an instant message (Text/Voice/Video) chat request from the web page. This chat conversation can occur within the R2B web pages or in separate web pages or client software after initiation.

Figure 1:
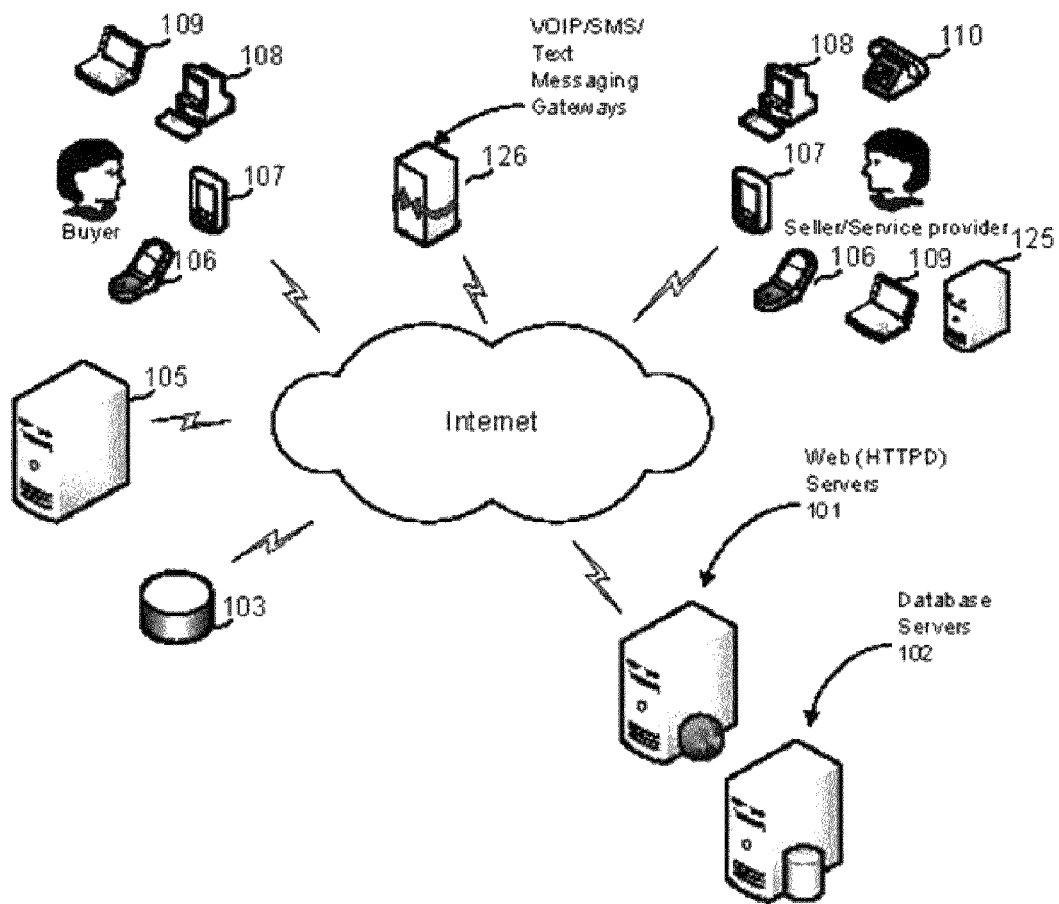
FIG. 1 etc. illustrate aspects of the present invention and various embodiments.
Figure 2:
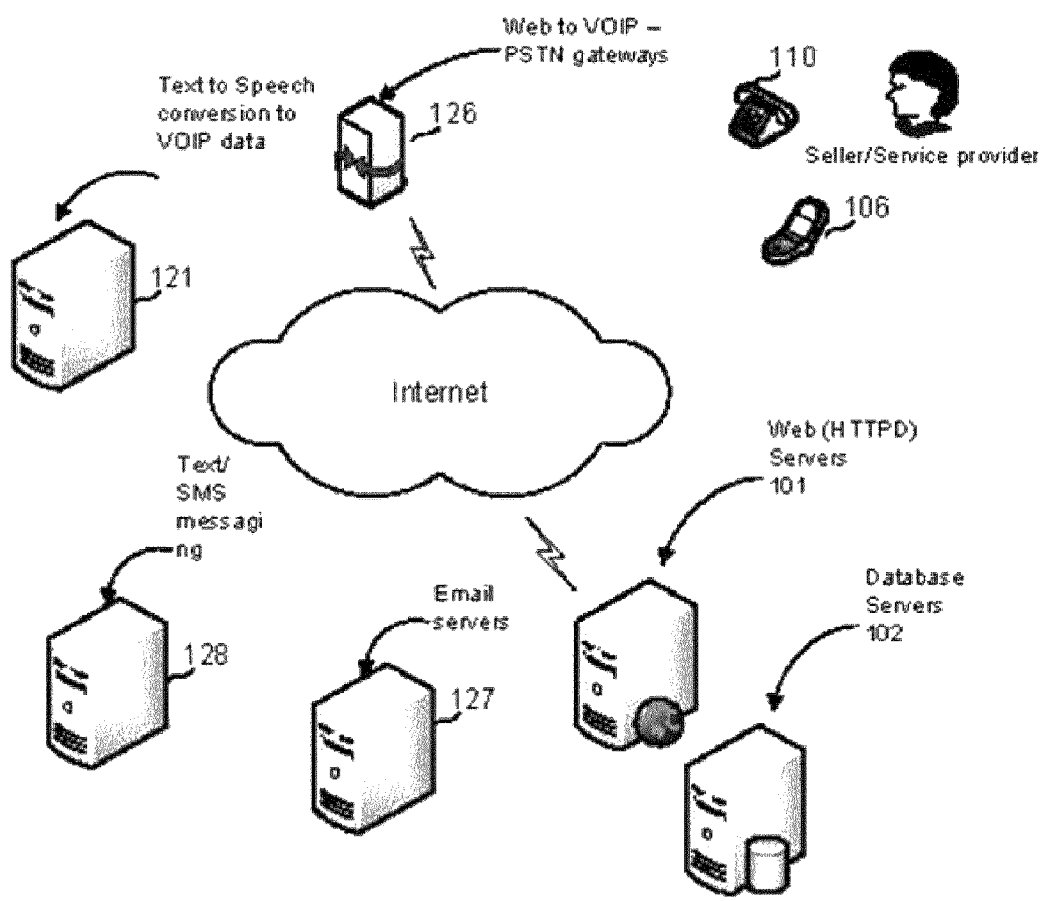
Figure 3:
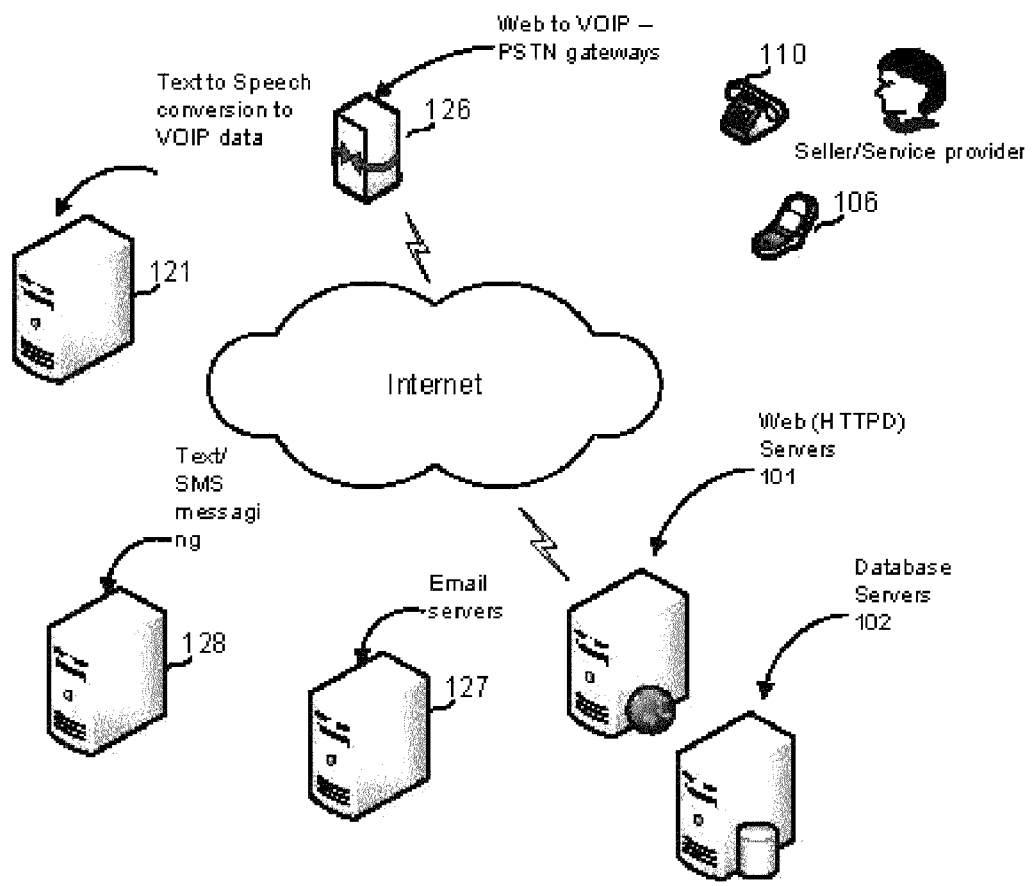

Click-to-chat/or Click-to-call with text IM or/voice IM Instant messaging from Buyer/Seller/Service providers email message FIG. 2.

Web to phone voice messaging "we have a Lead for you"—Buyer requests are converted using text to speech from text technology and sent to one or more Sellers/Service providers to their phone and play the request FIG. 2.

Partner external database 103 search capabilities—Buyer requests matched with our partner database located anywhere, over the web.

Time duration management—Buyer requests is kept active for a specified time by the Buyer. Ex: looking to buy a car request is kept active for only 2 months (as selected by the Buyer)

Seller/Service providers Dashboard-Web Front System for customer response management. —Sellers/Service providers can view the Buyer requests on a dash board with advanced features to sort, search and filter. They can initiate responses from this console, keep track of their responses to each Buyer request and manage their customer interactions.

Integrate with SMS gateway services to send SMS messages to any cell phone in 100+ countries. SMS messages can be sent from the web service to any carrier around the world in each region. FIG. 2.

Credit card payment method for Seller/Service providers listing—Sellers/Service providers pay for listing service on R2B using their credit card or other web based payment methods. We may also collect payment offline through sales agents.

Language options—text strings are translated, stored and retrieved with language index for the forms, categories and locations. R2B web pages will be displayed in the local language based on the browser language setting automatically or user selection. All the messages to communicate to Buyer/Seller/Service providers will be maintained in that language. Optionally, machine based or human based translations may be used to relay requests from one party to another.

Template—needed for creating custom look and feel for partners—R2B look and feel can be customized to match our partner brand or co-brand. Using CSS definition and user interface parameters, can match colors, fonts and images to partner sites.

Favorite Seller/Service providers bookmarks and referrals—after the Buyers register with R2B, they can create a Bookmark to add their preferred Sellers/Service providers. They can then share this list of preferred Services/Service Providers with their friends and family for recommending the Sellers/Service providers or sharing their experience. Sellers/Service providers may reward the Buyers for referring them to new Buyers.

Figure 8:
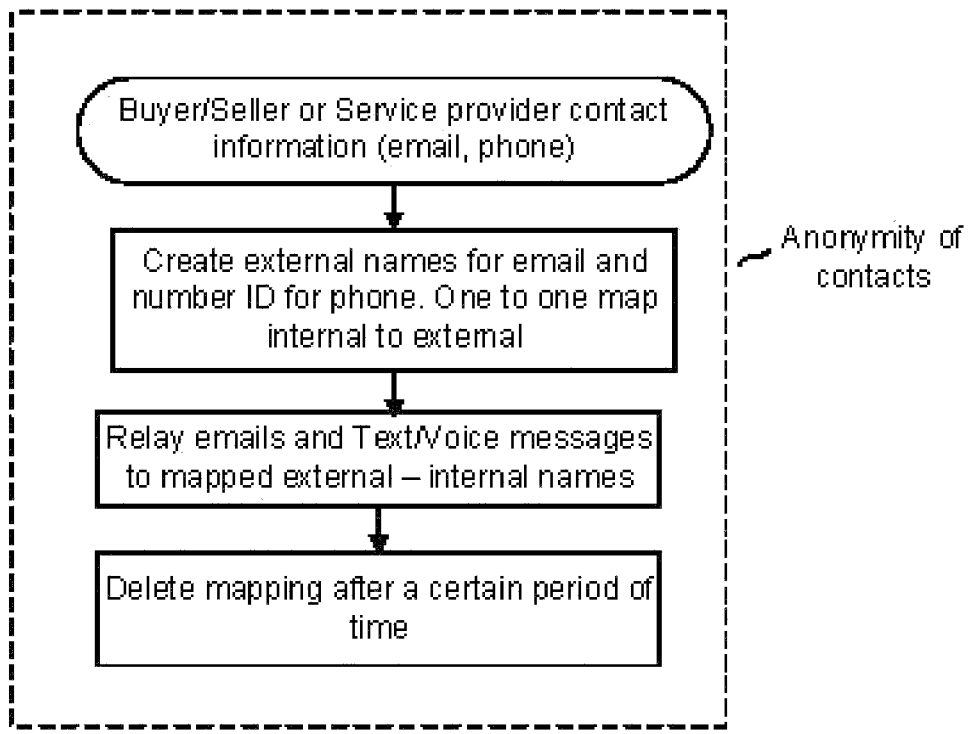

Anonymous bidding—FIG. 8 Buyer requests can be posted to be seen by Sellers/Service providers. The postings for requesting product/service can optionally remain anonymous. Sellers/Service providers can post responses for the Buyer requests and can also remain anonymous. Both Buyers and Sellers/Service providers may choose nick names to be identified but remain anonymous. This feature enables open negotiation and bidding. Competitive Sellers/Service providers may outbid others with price or service features/support/quality promise and other terms.

Ability for Sellers/Service providers to add, edit delete their listing. Sellers/Service providers can publish their instant sales/deals, daily specials or other promotional information through their account after sign up. They can update their content (audio, video, images, data, discount coupons, discount data, discount coupons, discount liners of text that indicate special promotions.

Sellers/Service providers can maintain a list of their Buyers list in their account to send updates and notifications, marketing promotions.

Social networking aspects: both Buyers and Sellers/Service providers can maintain their circle of friends, family and professional association with allied businesses and partners.

Friends will build their favorite list of service providers that they can share on their social networks. Local businesses can do the same ex: auto service can be partnered with windshield replacement service, detailing service or audio installation service. A trusted business can refer their customers to other partner services (mutually).

Reviews and Ratings—detailed reviews including questions of relevance and importance to each category is created, a point system is assigned and average ratings for each of those answers is displayed.

Ex: doctor>how good did they treat you? Did they make you wait? Would you refer them to your friends? Do they know the modern treatments?

Limo>Were they on time? What rating would you give to the quality of their car? Was the driver polite? Were they professionally dressed?

In one example, a web server system uses PHP with AJAX and/or MySQL database(s) 102. Alternate systems, platforms, coding languages and databases may be used. The core engine is designed to be highly responsive and scaleable. Structured database queries may be setup with variable fields for each form. Listings may be quick searchable and sorted in alphabetical order. Queries may be saved and retrieved for matches each time new data is added in that category. The system interfaces are modular to interface with internal database 102, external database 103 with queries or API. (There are other ways to implement the logic including but not limited to Java, JSP, Perl, Cold Fusion, ASP, Ruby on Rails or other databases such as Postgress SQL, MS SQL, Oracle etc.)

Figure 7:
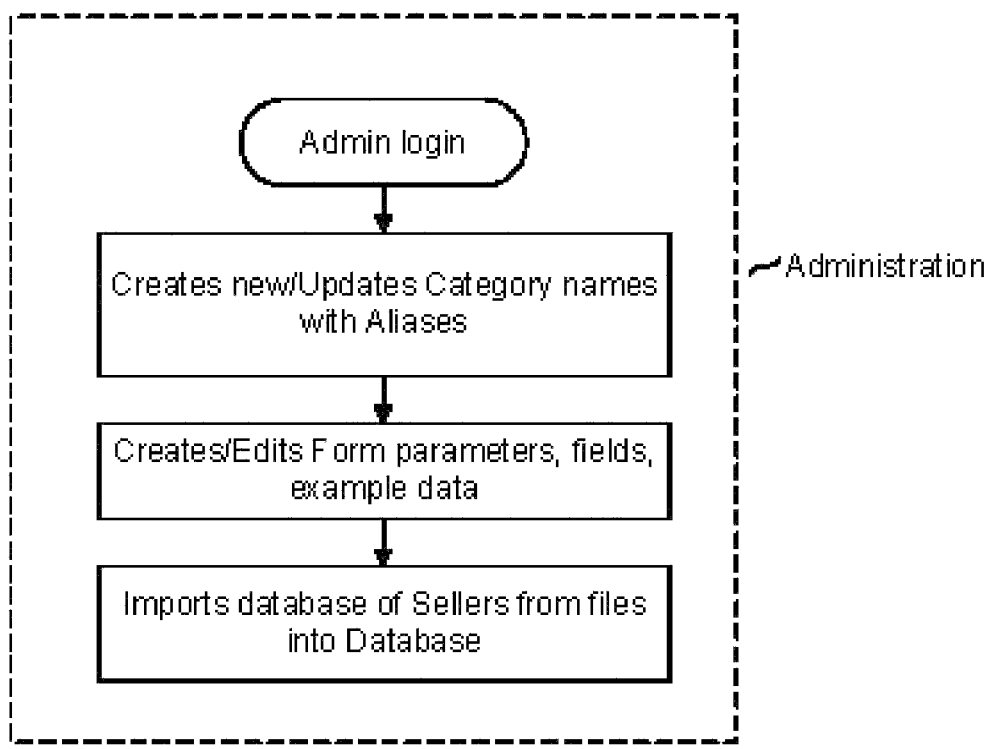

The customized forms with database entries can be adapted with a front-end interface to create new applications instantly without reprogramming. The core product consists of the following modular components, integrated seamlessly with well defined interfaces:

- Core database 102 (Categories, Location, User information)
- Common Classes, Libraries (sessions, image handling, etc.)
- User front-end—CSS/Templates
- Personal mailbox bins
- Search and match text pattern matching modules used for categories, keywords, location and filter fields.
- Notification module for email/Text/Voice/SMS messages
- Form creation component FIG. 7
- Interface to internal and external data sources and/or API for accessing information from partners and affiliates.
- Mobile data exchange module to communicate to mobile devices and phones.
- Time duration management for managing the time period during which a request is maintained.
- Business listing module
- Security Layers
- Advertisement & Promotion engine
- Mobile interface (adapted, formatted version)

The system may be initially designed, for example, to accommodate 300,000 registered users and 1,000 simultaneous users and yet be scalable to accommodate more users as needed. The website may be hosted at multiple locations and on multiple servers and may comprise clustered web 101 and database servers 102.

A website embodying many of the embodiments of the invention may be configured to provide editing, creation and deletion authorization to an administrator or other user FIG. 7. The parameters for each category can be entered without needing to code the Form. Each parameter can be specified with the format and length of the fields. Aliases can also be created so when related search terms are used by the Buyer, they will refer to the category as matched in the alias list. List your Business/Service field can also be setup specific to the category.

Figure 9:
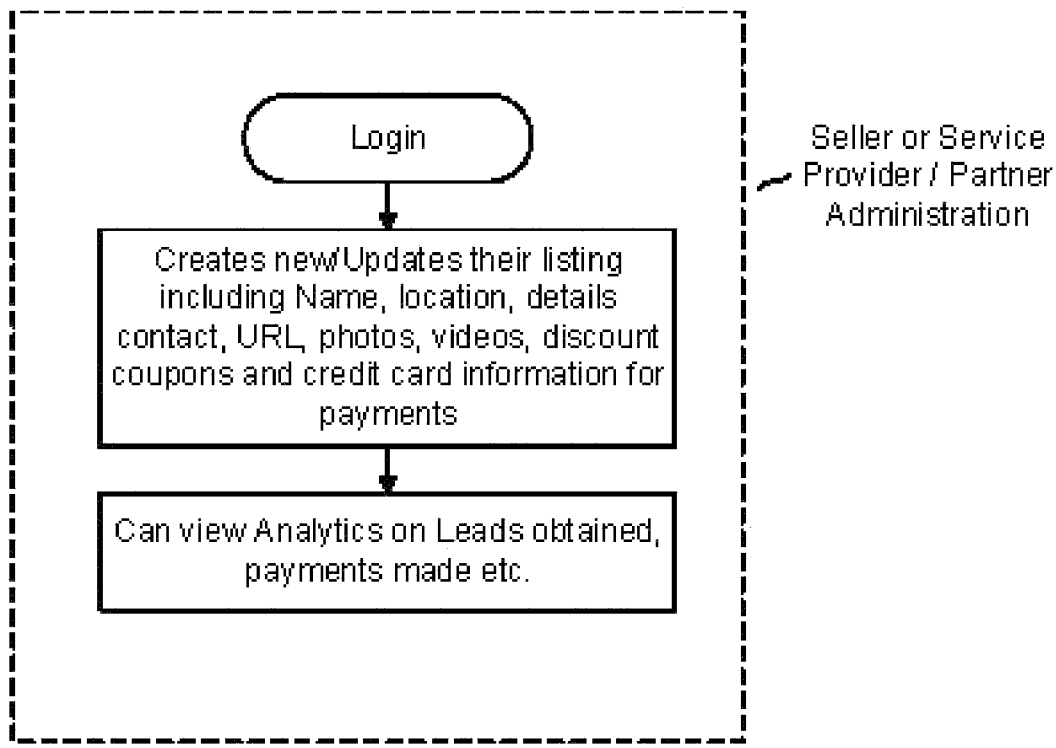
Figure 10:
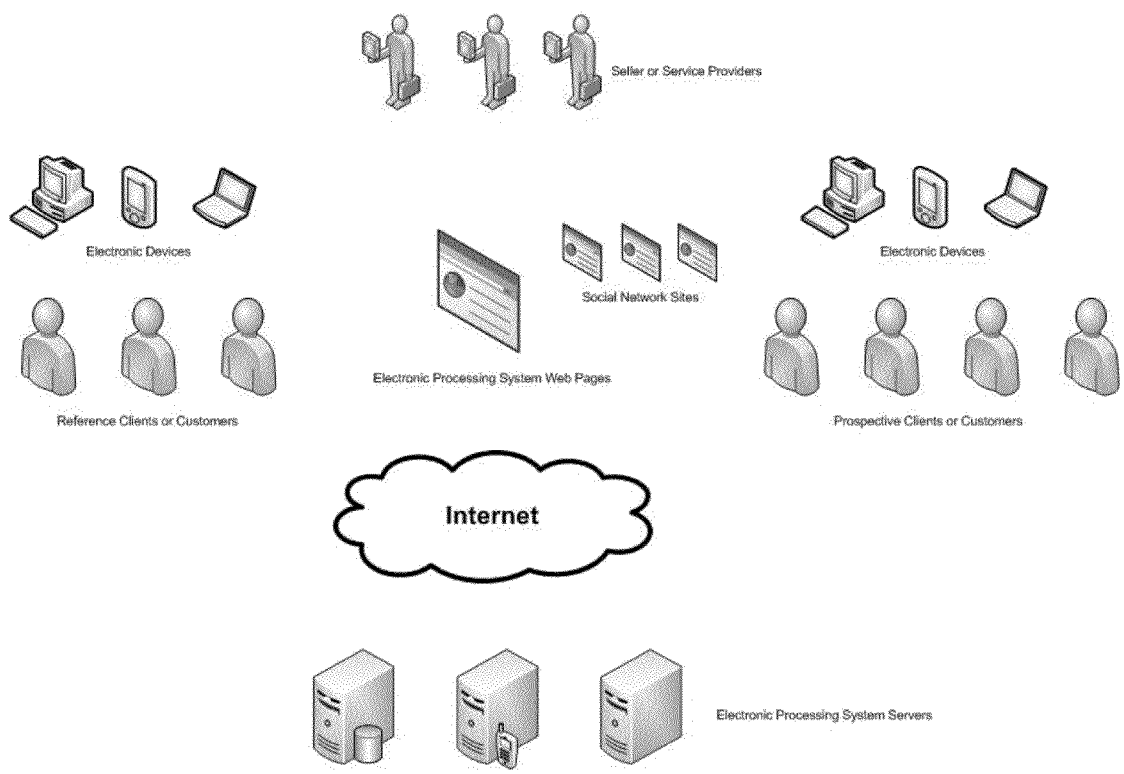
Figure 11:
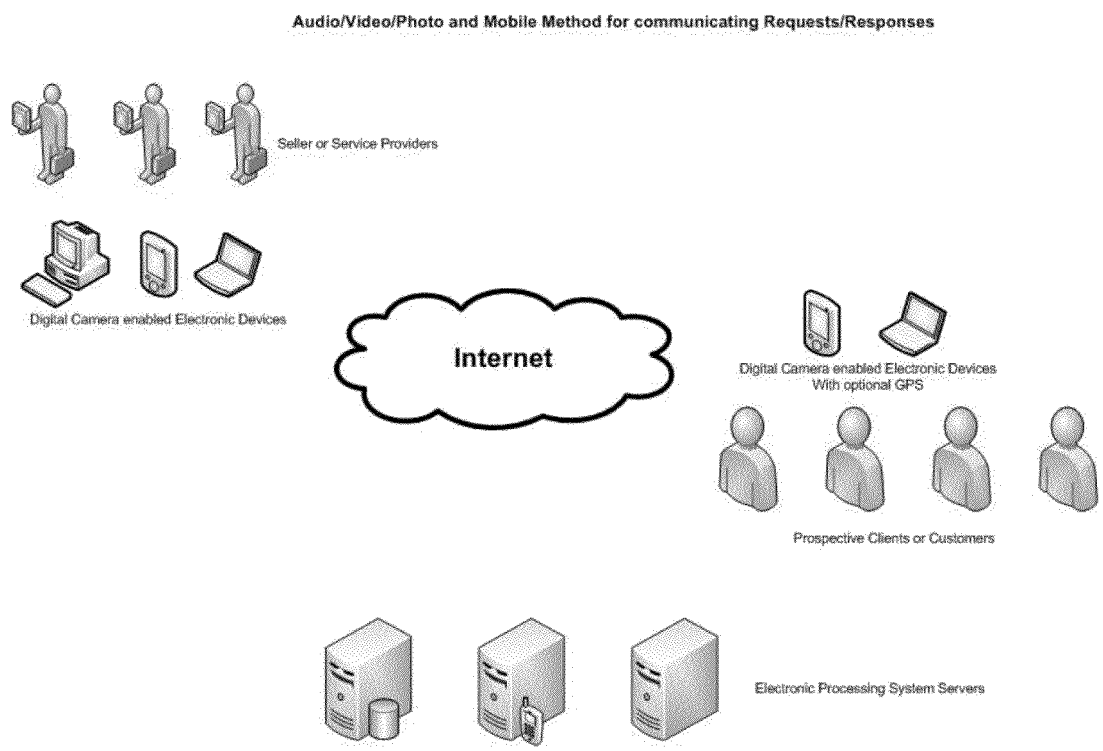
Figure 12:
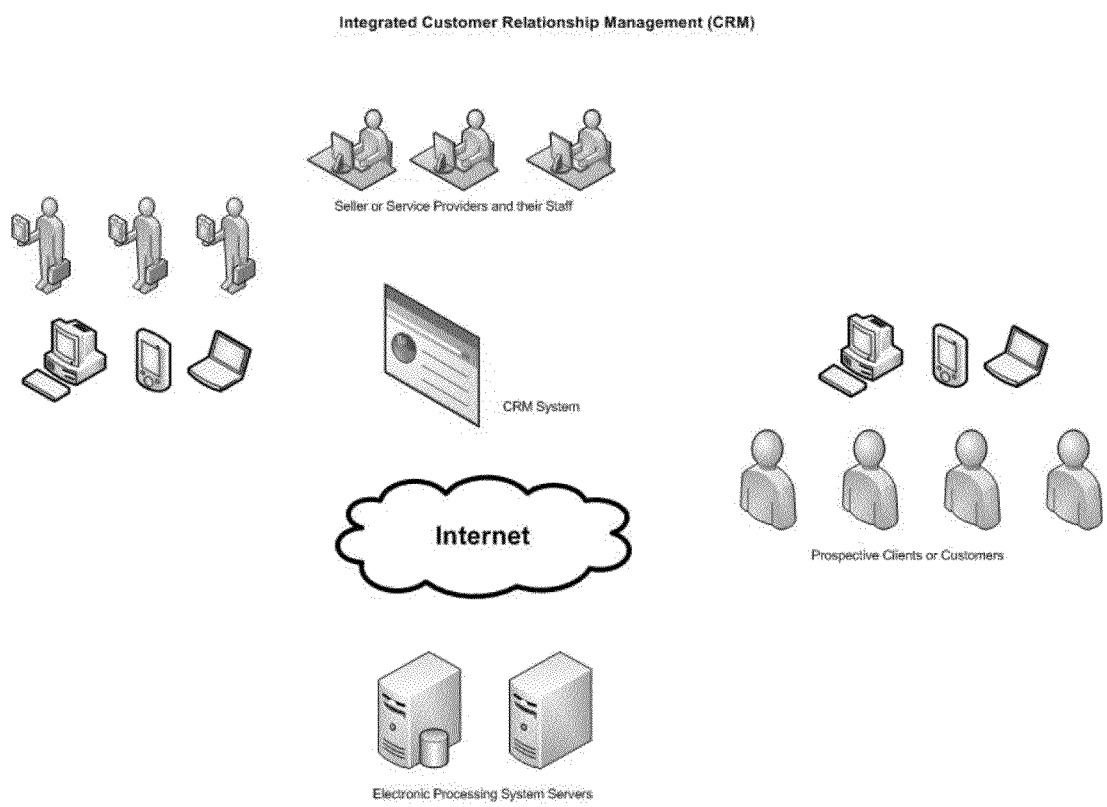
Figure 13:
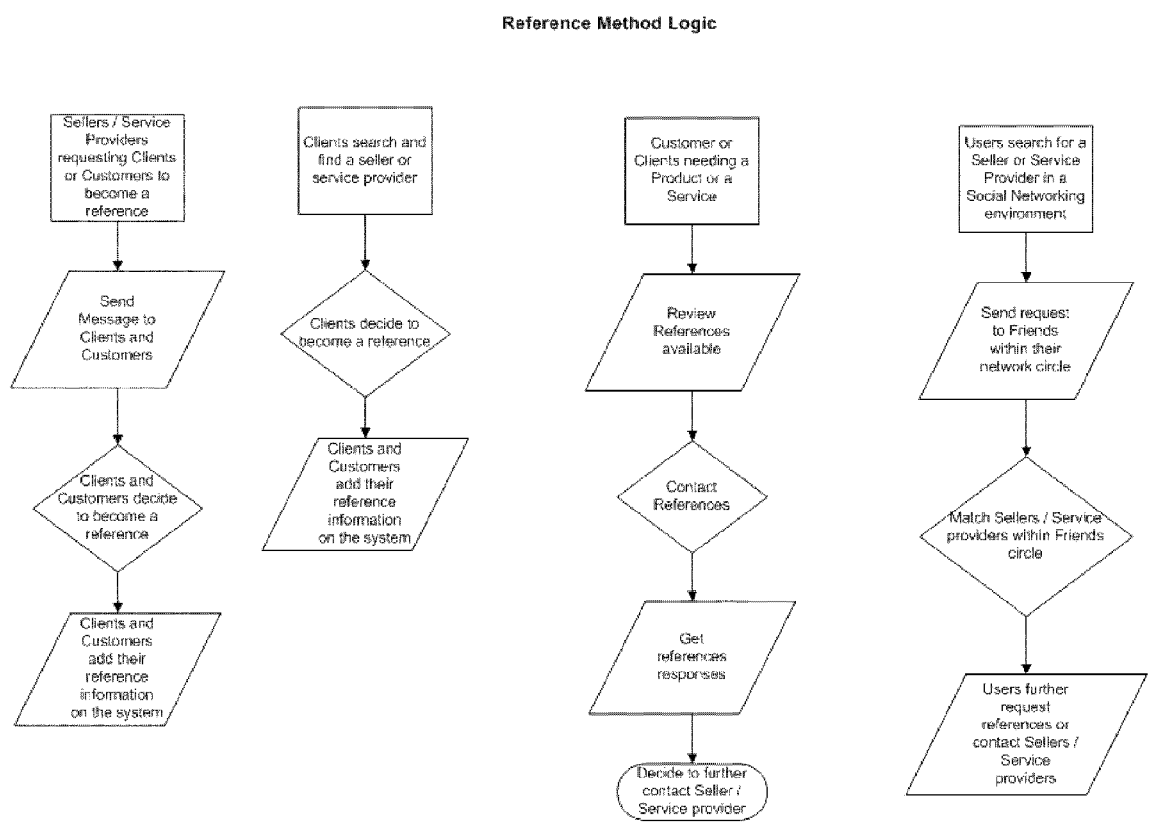
Figure 14:
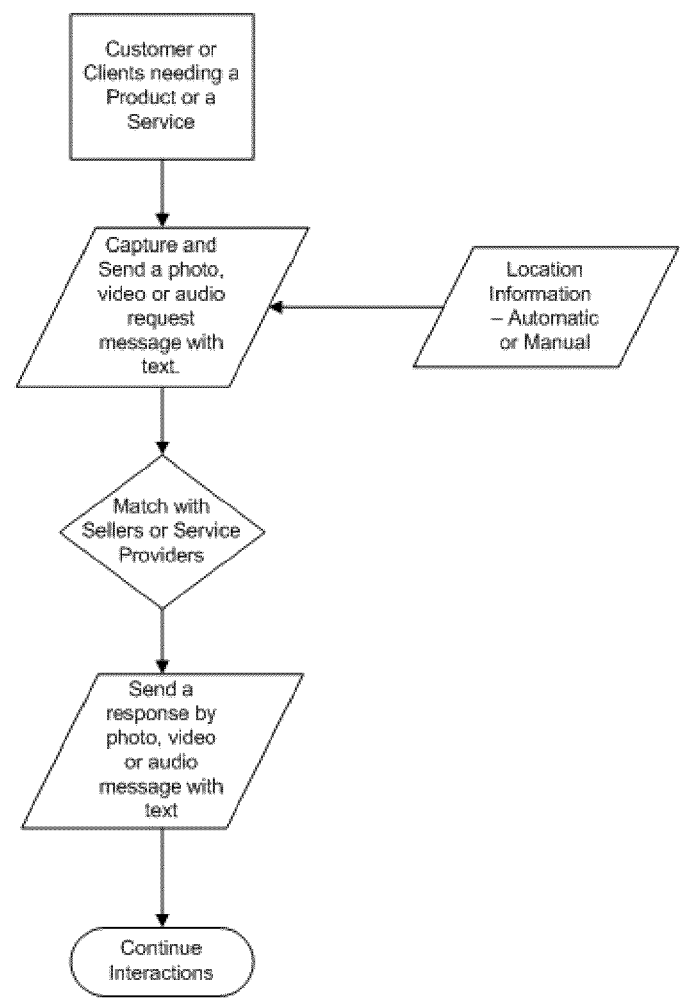
Figure 15:
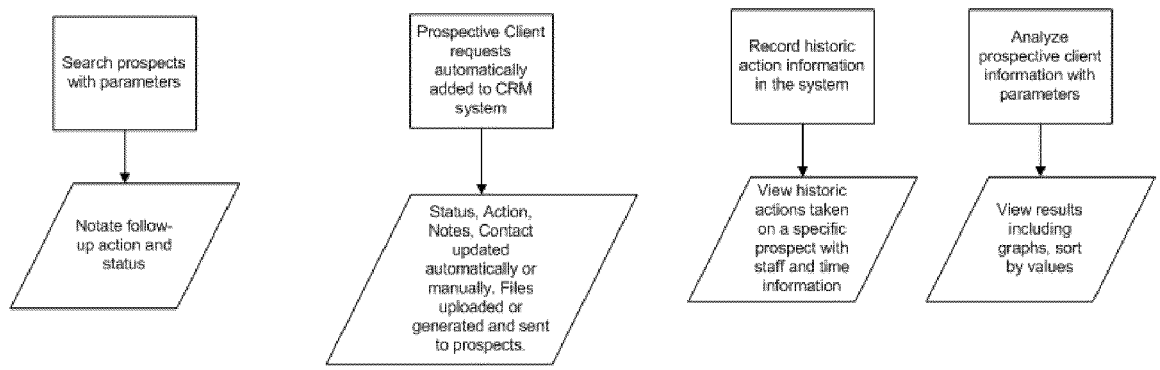
Figure 16:
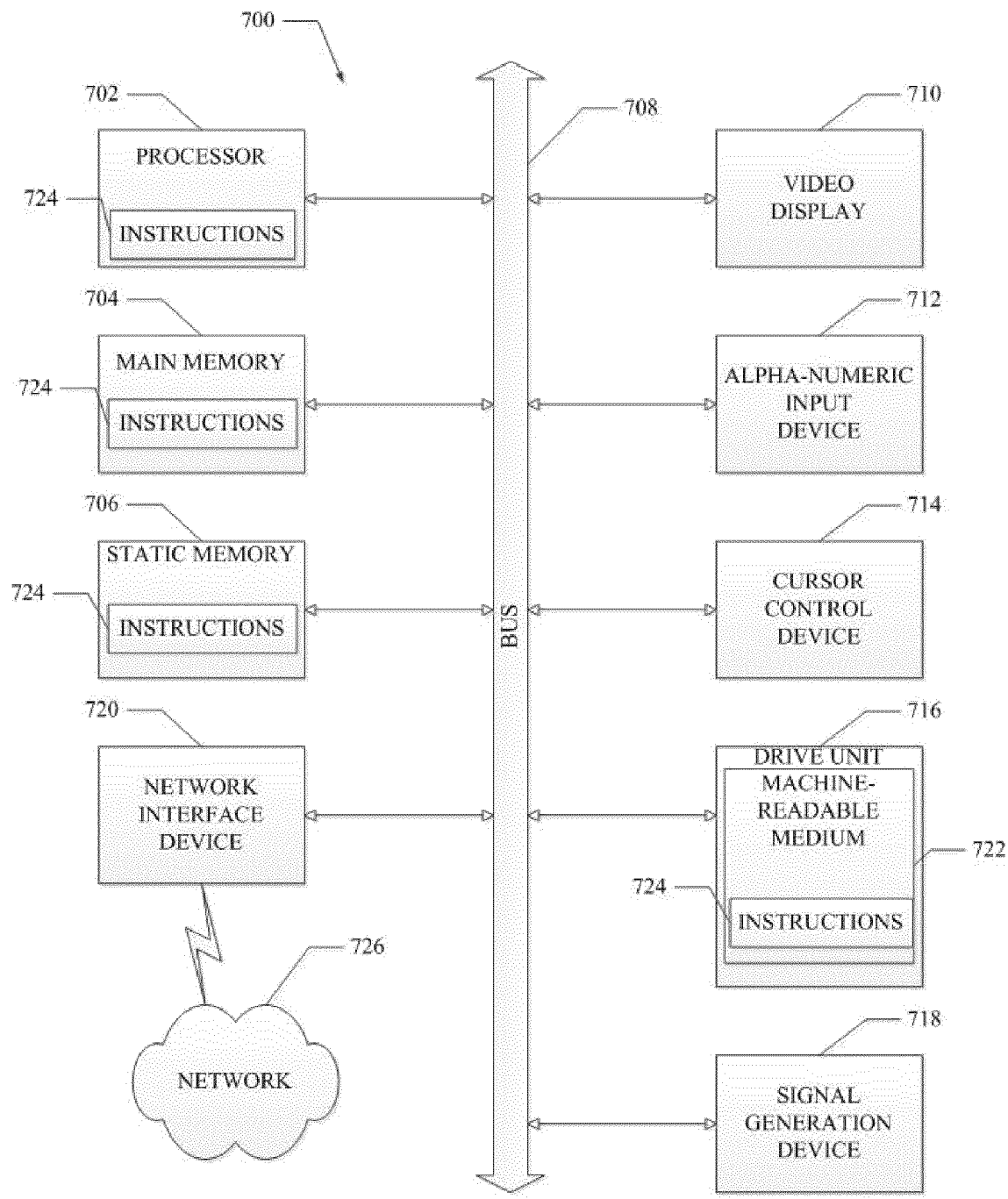

In another embodiment of the invention, Sellers/Service providers can add their business, service and/or product by clicking a button and logging in FIG. 9. The name of the button or link may vary depending upon the category, for example, List your Service, List your Practice, List your Dealership etc. Sellers/Service providers can specify their specialization or service area, for example, Neurologist, BMW Dealer, etc. Sellers/Service providers can choose their geographic coverage—city wide, multiple cities, entire state, country wide, worldwide or to only a specific locality or metro area within a city. The price for listing varies based on the area of listing coverage.

Sellers/Service providers may choose to receive Leads by emails on their computers 108, 109 or mobile devices 106, 107 or SMS/Text messages on their cell phones 106. In another embodiment, Sellers/Service providers can also choose to get Leads over the voice telephone 110 or cell phones 106 with text to speech converted voice messages. Accordingly, Sellers/Service providers may receive a message through their phone that a Buyer is ready to purchase. Moreover, the Seller/Service providers may be prompted, for example, to press zero to be connected with the Buyer, whereupon the Buyer and Seller/Service providers can be connected over the phone or through text messaging using text to speech tools. Sellers/Service providers may register and login to see the messages they received from interested Buyers in their message box.

Certain embodiments of the invention cater to the needs of connecting localized products, services and/or businesses with consumers. They can share their specific solutions to problems and suggestions with the other users in their online community. Users can rate business and enter their experiences. Their content can include text, voice, audio or video.

Information from Buyers and/or Sellers/Service providers may be matched into categories. For example, typed categories for products and services are matched with the listed categories and aliases in the system. Location matching is done for cities and localities with names and zip codes. Sellers/Service providers can add filters based on their product/service preference, for example, an auto dealer may filter based only on a car maker such as Benz or BMWs and not other makes. Sellers/Service providers can use ctrl mouse click to select multiple filters or categories. These parameters are stored as filters in the DB and when Buyer chooses the make, can reduce the listings to only those that match and display only the filtered results on the right navigation bar. For example, a first Buyer chooses doctors and then when the form loads, Buyer selects Orthopedist the right hand side only will then display the filtered list using AJAX.

Location mapping may be provided using IP location mapping automatically (helps to reduce the number of cities displayed). Buyer can override and select another country or state different from the default value now displayed. Custom country and/or local forms may be used. If there is a local custom form, that is used instead of the default.

In another embodiment of the invention the web site may have the ability to add other languages. The language may be based upon browser language and can be overridden by user input. Only Buyers and Sellers/Service providers that have the same language preference may have a preference when matching.

In yet another embodiment of the invention, double blind anonymous emails/SMS or Test Messages relaying for Buyer and Seller/Service provider communications may be used FIG. 8 with the ability to disable the relaying if desired by the Buyer/Seller/Service provider. A listing number is generated and saved for each listing and used for deleting listings in memory as emailed by users to remove their listing.

In yet another embodiment of the invention, Sellers/Service providers can add their website link, online photos or videos FIG. 9. Sellers/Service providers can add discount coupons with codes that can be redeemed by the Buyer. Alternately, Buyers can print the coupons and use it to redeem the discounts. Photos and videos can be added by uploading the images and video files or by linking to an outside website that serves the image and video. The content including but not limited to photos, video, discount coupons, maps, contact information, text description and web links are displayed when Sellers/Service providers are listed.

In another embodiment of the invention, the system may search for outside Seller/Service provider sites, for example, sfgate, craigslist, alibaba, oodle, etc. The system may also provide a dynamic Seller/Service providers listing for cars from owners, personals, job openings, musical instruments, etc within the website.

In yet another embodiment of the invention, a mobile version of the website may be available, for example, for mobile smart phones or browser phones 106, hand held computers and personal data assistants (PDA) 107. Mobile versions may incorporate a simpler interface adapted for small screen and keyboard. AJAX may also be replaced by standard mobile browser code that will work. If the device provides location information, it can be used as the default with location mapping, that the user may override.

In another embodiment of the invention, the information about the Buyer's request is sent to another information system, typically a CRM (customer resource management) system 125 or other proprietary information system. This can be in addition or alternative to the email/Voice/SMS/Text message being sent.

In another embodiment of the invention, the data entered by the Buyer is validated with rules FIG. 4. Ex: email field is validated with multiple rules such as checking for the presence of the @ symbol, a valid domain name, no special characters etc., validating the name field may include checking for minimum number of characters, no special characters or numbers etc., checking for bad words against a list of predefined foul words and replacing or deleting them, checking for phone numbers entered to be of valid format and other validation mechanisms for data input. Checks are also made to ensure that a human is entering the data by means of a captcha (images displayed to be entered by the person manually). Additional validation may include checking for detection and prevention of multiple submissions within a given time based on the IP address.

In another embodiment of the invention, the users may be channeled from other external websites 105 such as search engines, portals or partner sites, there by bypassing the category search. Ex: traffic from a portal or search engine when someone searches for doctors in los angles will be sent to R2B to be matched with potential listings in our own or external databases 103.

Figure 5:
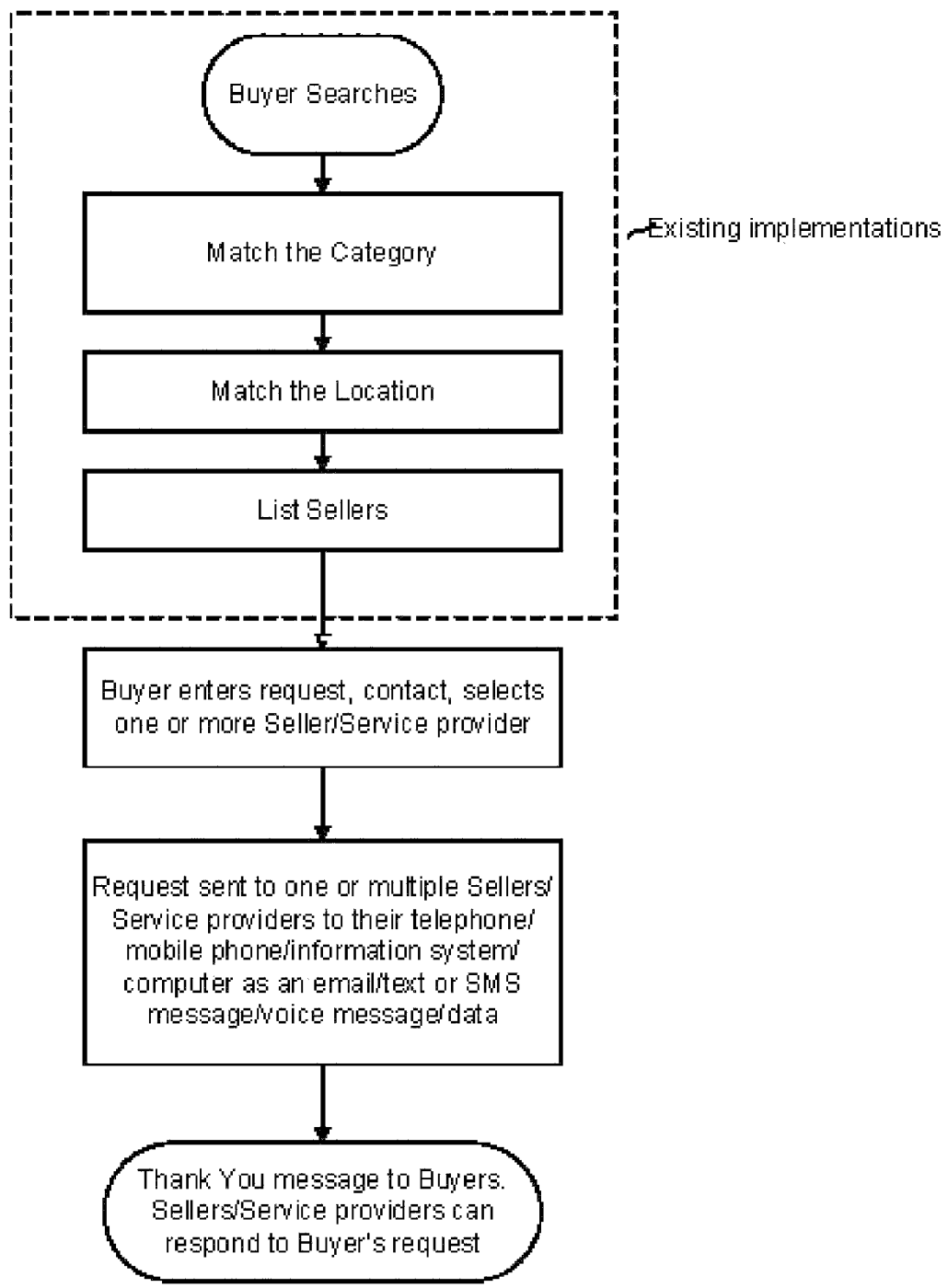

In yet another embodiment of the invention FIG. 5, the mechanism of sending a Buyer request to one or more Sellers/Service providers is integrated within another existing listing system including several websites that provide listing information. In such scenarios, Buyers can select one or more of the services, fill in their request and submit that request to be sent. In some cases, the Sellers/Service providers may or may not be listed for the Buyers to see them.

Security Layers to prevent abuse of application with captcha images, requiring interactive input of visual displayed character strings manually by a human user. Checking the rate at which a request is generated from an IP address (velocity of access), filtering bad words automatically, limiting user data input to range of valid data, requiring valid credit card information from Sellers/Service providers and triggering notifications to the administrator on new addition of listings for verification are some of the methods implemented.

Advertisement & Promotion engine to manage relevant advertisements and sponsorships in categories and locations.

Mobile interface adapted, formatted version for varying devices and browser rendering formats including XHTML versions and device specific display modifications.

In yet another embodiment of the invention, the Buyer could chat with the Seller/Service provider using a messaging system (chat or instant messaging) comprised of Text, Audio or Video.

In yet another embodiment of the invention, the Seller/Service providers are provided with built in analytics to track their performance ranging from traffic sources to lead details FIG. 9. Partners, both on the Seller/Service provider side and Buyer traffic side can be added to the system to enable revenue sharing. They can also track their performance and payments using the billing and analytics system. A credit card billing system is implemented with setup fees and automated recurring billing for Lead fees payment. The system is designed for world wide use with multiple currencies and localization.

Further Embodiments

R2B provides an on-line venue in which Buyers can anonymously communicate precisely what product or service they want to purchase by posting an interactive request that a number of Sellers/Service providers can then directly respond to.

This concept reverses the traditional model for classified listings or directory advertising by promoting the Buyers interests in directly matching their needs with qualified vendors. In contrast to what Craigslist, Yahoo, Google and others provide, where the Buyer has to search within each Seller/Service providers and then send their request. R2B broadcasts Buyer's needs to relevant/selected Sellers/Service providers.

This concept takes the burden off of the Buyer in finding the right products and services by self-qualifying the Lead to proactive prospective Sellers/Service providers.

How it Works

The Buyer types R2B.com or www.R2B.com in their web browser. Buyer could optionally register with R2B, selects a user name and password. The site main page features a category/product/service search box appears where the Buyer types what he/she is looking for. Within a few characters of typing, relevant category names are displayed below, which can be clicked to select. Alternately, Buyer can type the entire category name and hit enter. The next screen will enable the user to select the location such as city/locality/zip and radius. Based on the location business that match the zip code and radius or city and locality are displayed, along with a request form. The request form allows the Buyer to select a product or service category and how they would like to be notified. Notifications can be via email, SMS mobile phone notification, or through a traditional telephone/cell phone number. Once the request is ready for posting, the Buyer receives a confirmation message on a web page.

When the request is posted, previously registered or partner Sellers/Service providers that match the request are emailed the Lead and can proactively respond to the seller. Once the Buyer and Seller/Service providers are matched, the business transaction can be handled independently or facilitated using R2B buying and selling services.

Sample Listings

Static Directory Listings: Attorneys, Auto repairs, Dentists, Florists, Garden supplies, Home improvement, Insurance, Locksmiths, Movers, Pest Control, Physicians, Plumbing, Painting, Roof repair, Limousines, Carpet Service, Handypersons, Housecleaning, Restaurants, Security, Storage, Vets, . . . .

Dynamic Classified Listings: Antiques, Appliances, Art & Prints, Automotive, Business equipment, Building materials, Cameras/Video, Clothing, Collectibles, Computer equipment, Food & Recipes, Furniture, Musical Instruments, Sports Equipment, Tickets & Events, Personal Ads, Employment, Rentals, Real Estate, . . . .

Each listing will have a form in which the user inputs the specific request with as much relevant information.

Applications

R2B caters to the needs of connecting localized product/service businesses with consumers. Buyers can list what they specifically want in their local area and get connected to the right businesses. They can also share their specific solutions to problems and suggestions with the other users in the community.

Buyer Benefits

For the end user, R2B eliminates the need for searching for needed products and services from several websites. Users can list their requirements and do not have to come back to the site each day to poll for possible Seller/Service providers listings. Within the time frame specified by the user, the search continues automatically and the user is notified when a match is found.

Searching for services becomes easier with the click of a button without having to manually go through each printed yellow page and phone number, calling each of them and repeating the same information.

The power to shop now shifts to the Buyer with the ability to reach all the listed suppliers at once.

With the ability to notify on mobile phones, Buyers and Sellers/Service providers can instantly know of the responses to their listings. With the click of a button can make a call and can know more information or negotiate price.

Seller/Service Providers Benefits

Businesses benefit by getting qualified Leads directly from seriously interested Buyers.

Sellers/Service providers don't have to openly display price but understand the need better and negotiate with each Buyer, one on one.

They can better understand the customer requirements, maintain a closer relationship and address their future needs as well.

R2B becomes a complimentary offering to its partner Seller/Service provider's sites, yellow pages and classified listings.

Details

Buyers can remain anonymous until the deal is closed. A radio check box that says "make anonymous" which is next to their email ID. We enable a relay mechanism for emails by creating a random ID.

Search and match technology pre-qualifies Sellers/Service providers for Buyers. Buyers can elect in which data bases they wish to search and Sellers/Service providers to be contacted. Buyers can view more details about the Sellers/Service providers, before they opt to contact them. Multiple Sellers/Service providers can be reached through various ways—phone, email, SMS/Voice/Text message, instant messaging.

R2B breaks the ineffective "old style" model of advertising where advertisements are displayed with further hopes of attracting targeted Buyers. The "old style" model was adapted from the television and radio methods of broadcast, where Buyer input was not possible. In our service, Buyers come with the need to buy a product or service, search with specific requirements, get matched locally and can instantly connect to Sellers/Service providers.

Buyers can rate and rank Sellers/Service providers—service quality, relevance and merits/demerits of a particular Seller/Service provider can be reviewed and rated based on past experience from Buyers. Buyers can provide useful information relevant to the category and location for each type of service/product to help others.

AJAX technology speeds up the process user search and navigation and improves the User Interaction and usability. AJAX is a good way to implement this at various steps from searching the category, displaying the form with location information to delivering the message. AJAX Flow: Category partially entered>display category list>Category completely entered>display form>location entered>list Sellers/Service providers to whom request will be sent>submit>send the request, displaying a green button for each Seller/Service providers listed.

Revenue Models

Sellers/Service providers pay monthly or yearly subscription to obtain information about Buyer's request. Price can vary based on the area of coverage (specific locality only, single city only, multiple cities, entire state, country.) or functional elements (Sellers/Service providers receiving SMS/Text/Voice messages or phone notifications, options to add just photos or videos for an extra fee) etc.

Premium features are fee based on a per transaction basis
    Monthly subscription. (or per ad cycle)
    Advertisers pay a fee for advertising within selective sections. Standard Advertising (banner)
    Sponsored Links appear on right side of page.
    Matched Links appear in Matched Section.
    Ready to Sell Links by rotational or rating and ranking
    Sponsored messages on email/SMS/Text/Voice Message.
    The site is free for the Buyers but may offer a premium service.
    Lead generation revenues as well as transaction fees.
    Buying Resources (sponsored links)
    Related or Featured Items (sponsored links)
    Most Popular Products within Category (sponsored links)
    Reward return from Seller/Service providers to Buyer through R2B, R2B gets a percent as transaction fees.

Architecture & Technology

R2B is developed using PHP scripting with AJAX and MySQL database. The core engine is designed to be highly responsive and scaleable. Structured database queries will be setup with variable fields for each form for specific application. Listings are quick searchable and sorted in alphabetical order. Queries can be saved and retrieved for matches each time new data is added in that category. The system interfaces is modular to interface with internal database, external database with XML queries. The customized forms with database entries can be adapted with a front-end interface to create new applications instantly without reprogramming.

The core product comprises the following modular components, integrated seamlessly with well defined interfaces:

Core database
    User front-end
    Personal mailbox bins
    Search and match
    Notification module
    Form creation component
    XML/API interface to external data sources
    Mobile data exchange module
    Time duration management
    Business listing module
    Advertisement & Promotion engine XML Interface: We define an XML/API interface to transmit the listings to other sites. This interface has the fields and data for each listing created and instantly transmitted for matching and responses.

Listing in Memory: Each time a listing is created, it will be saved. Each time a new Seller/Service providers listing is added, we will check for matches against existing saved listings.

Listing number: This will be generated and saved for each listing and used for deleting listings in memory as emailed by users to remove their listing. If a user forgot the listing number, the listing can be identified with the listing email and the content.

Recurrent response prevention: There will be checks to prevent responses resent from the same Seller/Service providers email address/user to the Buyer email address/user. Ex: a business that checks the web pages for the Buyer and sends a response may have already sent a response from the listing notification sent to them. This can be prevented by checking Buyer, Seller/Service providers email Ids and listing message.

SMS window: SMS messages are shorter than the email messages and optimized for small screen display.

Archives: We will maintain an archive for each registered user to preserve their history of listings.

Soundex: Similar sounding words matching for text searches.

Localization:
1. Get country and state using IP location mapping automatically (to reduce the number of cities displayed). However, Buyer can override and select another country or state different from the default value now displayed.
2. For hint examples, show local currency for that country or chosen location.

Filter and Matching:
Filters are used based on Seller/Service provider's preference. ex: an auto dealer who only deals with Benz and BMWs and not other makes. Sellers/Service providers can use ctrl mouse click to select multiple. These options are stored as filters in the DB and when Buyer chooses the make, can reduce the Seller/Service provider's listings to only those that match and display only the filtered results on the right nav bar. ex: First Buyer chooses doctors and then when the form loads, Buyer selects Orthopedist the right hand side only will then display the filtered list.

Listing Sellers/Service providers may list under multiple cities and localities. Sellers/Service providers can list their business under multiple countries, states, cities and localities. Sellers/Service providers can list multiple zip codes when they add their business.

Additional Product Features for Some Embodiments
  Categories/Aliases, Form Generator Administration
  AJAX Flow
  ListYourBiz Page
  Buyer Search Page—Admin access only
  Buyer Search Results Page—Admin access only
  Foul language check and replace
  Security captcha image data input
  Email validation
  Phone number validation
  Information pages on footer
  Location Management—US states, cities added
  Initial Categories, Alias names and Form Parameters—15 categories
  Single sponsor on site and Text messages
  Filtering based on specific products/services
  Seller/Service providers adding photos, videos, URL, discount coupon images, map display
  Language strings for translation—English, Spanish
  Batch mode db import
  Seller/Service providers add listing—select multiple cities & localities
  Seller/Service providers paid Lead Revenues
  Buyer traffic and Seller/Service providers add Partner Management
  Analytics—Sellers/Service providers and Partners
  Integration with external CRM systems
  Local Ad sponsor support
  Localization based on auto location
  Anonymous email connections
  Language selection, currency, localized forms
  Reviews and Ratings
  Buyer added photos/videos for requests
  Auto location narrowed to state
  Coverage areas based and premium options
  Local ad enabled for paid sponsors
  Discount coupons code and tracking Examples of Categories
  Accounting Services
  Acupuncture
  Auto audio
  Auto Glass
  Auto Insurance
  Auto Service
  Auto Warranty
  Autos new/used
  Bankruptcy Lawyers
  Boat Maintenance
  Boat Supplies
  Child care
  Chiropractic
  Cosmetic Products & Cosmetic Services
  Cosmetic Surgery
  Cruises
  Dating Services
  Debt Settlement
  Dentists
  Divorce Lawyers
  Dry Cleaning
  education/training
  Employment Services
  Flower Delivery
  Food Delivery (Meat, Fruit, Veggies, Groceries)
  Hair Removal
  Health & Fitness
  Health Insurance
  Home Cleaning
  Home furnishing
  Home improvement
  Home Loans
  Home security
  Interior Design
  Jewelry
  Laser Eye treatment
  Limousines
  Moving Services
  Orthodontics
  Pharmacy
  Pool Cleaning
  Solar Power installation
  Trust, Wills/Estate planning Lawyers
  Vacation Shares
  Yoga Examples of Fields Used for Specific Categories

---

Table structure for table 'Airport Taxis'
CREATE TABLE 'Airport Taxis'
('Airport_TaxisID' int(6) unsigned NOT NULL auto_increment,
'CID' int(6) default NULL,
'numpass' varchar(50) default NULL,
'servicedate' varchar(50) default NULL,
'picklocation' varchar(50) default NULL,
'droplocation' varchar(50) default NULL,
'picktime' varchar(50) default NULL,
'airline' varchar(50) default NULL,
'notes' varchar(250) default NULL,
'dflag' int(4) default '0',
PRIMARY KEY ('Airport_TaxisID')
) ENGINE=MyISAM DEFAULT CHARSET=latin1 AUTO_INCREMENT=1;

---

Table structure for table 'Autos'
CREATE TABLE 'Autos'
('AutosID' int(6) unsigned NOT NULL auto_increment,
'CID' int(6) default NULL,
'make' varchar(50) default NULL,
'model' varchar(50) default NULL,
'neworused' varchar(50) default NULL,
'year' varchar(50) default NULL,
'color' varchar(50) default NULL,
'options' varchar(50) default NULL,
'price' varchar(50) default NULL,
'financing' varchar(50) default NULL,
'warranty' varchar(50) default NULL,
'notes' varchar(250) default NULL,
'dflag' int(4) default '0',
PRIMARY KEY ('AutosID')
) ENGINE=MyISAM AUTO_INCREMENT=2 DEFAULT CHARSET=latin1 AUTO_INCREMENT=2;

---

Table structure for table 'Doctors'
CREATE TABLE 'Doctors'
('DoctorsID' int(6) unsigned NOT NULL auto_increment,
'CID' int(6) default NULL,
'speciality' varchar(50) default NULL,
'insurance' varchar(50) default NULL,
'appttime' varchar(50) default NULL,
'notes' varchar(50) default NULL,
'dflag' int(4) default '0',
PRIMARY KEY ('DoctorsID')
) ENGINE=MyISAM DEFAULT CHARSET=latin1 AUTO_INCREMENT=1;

---

Table structure for table 'Flowers'
CREATE TABLE 'Flowers'
('FlowersID' int(6) unsigned NOT NULL auto_increment,
'CID' int(6) default NULL,
'occasion' varchar(50) default NULL,
'flowertype' varchar(50) default NULL,
'pricerange' varchar(50) default NULL,
'dellocation' varchar(50) default NULL,
'deldate' varchar(50) default NULL,
'deltime' varchar(50) default NULL,
'notes' varchar(250) default NULL,
'dflag' int(4) default '0',
PRIMARY KEY ('FlowersID')
) ENGINE=MyISAM DEFAULT CHARSET=latin1 AUTO_INCREMENT=1;

---

Table structure for table 'Home Loans'
CREATE TABLE 'Home Loans'
('Home LoansID' int(6) unsigned NOT NULL auto_increment,
'CID' int(6) default NULL,
'proptype' varchar(50) default NULL,
'homevalue' varchar(50) default NULL,
'loanamt' varchar(50) default NULL,
'loantype' varchar(50) default NULL,
'ratetype' varchar(50) default NULL,
'downpay' varchar(50) default NULL,
'creditrating' varchar(50) default NULL,
'income' varchar(50) default NULL,
'payments' varchar(50) default NULL,
'hometype' varchar(50) default NULL,
'curmortgage' varchar(50) default NULL,
'currate' varchar(50) default NULL,
'notes' varchar(250) default NULL,
'dflag' int(4) default '0',
PRIMARY KEY (Home LoansID)
) ENGINE=MyISAM AUTO_INCREMENT=2 DEFAULT CHARSET=latin1 AUTO_INCREMENT=2;

---

Table structure for table 'Home Rentals'
CREATE TABLE 'Home Rentals'
('Home_RentalsID' int(6) unsigned NOT NULL auto_increment,
'CID' int(6) default NULL,
'rentaltype' varchar(50) default NULL,
'location' varchar(50) default NULL,
'movedate' varchar(50) default NULL,
'area' varchar(50) default NULL,
'price' varchar(50) default NULL,
'rooms' varchar(50) default NULL,
'leaseterm' varchar(50) default NULL,
'cargarage' varchar(50) default NULL,
'credit' varchar(50) default NULL,
'furnished' varchar(50) default NULL,
'pets' varchar(50) default NULL,
'notes' varchar(250) default NULL,
'dflag' int(4) default '0',
PRIMARY KEY ('Home_RentalsID')
) ENGINE=MyISAM DEFAULT CHARSET=latin1 AUTO_INCREMENT=1;

---

Table structure for table 'Lawyers'
CREATE TABLE 'Lawyers'
('LawyersID' int(6) unsigned NOT NULL auto_increment,
'CID' int(6) default NULL,
'areasoflaw' varchar(50) default NULL,
'casesummary' varchar(250) default NULL,
'appttime' varchar(50) default NULL,
'notes' varchar(250) default NULL,
'dflag' int(4) default '0',
PRIMARY KEY ('LawyersID')
) ENGINE=MyISAM DEFAULT CHARSET=latin1 AUTO_INCREMENT=1;

---

Table structure for table 'Limos'
CREATE TABLE 'Limos'
('LimosID' int(6) unsigned NOT NULL auto_increment,
'CID' int(6) default NULL,
'svctype' varchar(50) default NULL,
'vehicletype' varchar(50) default NULL,
'numpass' varchar(50) default NULL,
'picklocation' varchar(50) default NULL, 'droplocation' varchar(50) default NULL,
'pickdate' varchar(50) default NULL,
'picktime' varchar(50) default NULL,
'dropdate' varchar(50) default NULL,
'droptime' varchar(50) default NULL,
'price' varchar(50) default NULL,
'notes' varchar(250) default NULL,
'dflag' int(4) default '0',
PRIMARY KEY ('LimosID')
) ENGINE=MyISAM DEFAULT CHARSET=latin1 AUTO_INCREMENT=1;
---
Table structure for table 'Movers'
CREATE TABLE 'Movers'
('MoversID' int(6) unsigned NOT NULL auto_increment,
'CID' int(6) default NULL,
'type' varchar(50) default NULL,
'movingfrom' varchar(50) default NULL,
'movingto' varchar(50) default NULL,
'storage' varchar(50) default NULL,
'movingdate' varchar(50) default NULL,
'movingtime' varchar(50) default NULL,
'notes' varchar(250) default NULL,
'dflag' int(4) default '0',
PRIMARY KEY ('MoversID')
) ENGINE=MyISAM AUTO_INCREMENT=2 DEFAULT CHARSET=latin1 AUTO_INCREMENT=2;
---
Table structure for table 'Plumbers'
CREATE TABLE 'Plumbers'
('PlumbersID' int(6) unsigned NOT NULL auto_increment,
'CID' int(6) default NULL,
'service' varchar(50) default NULL,
'kind' varchar(50) default NULL,
'svcdate' varchar(50) default NULL,
'svctime' varchar(50) default NULL,
'notes' varchar(250) default NULL,
'dflag' int(4) default '0',
PRIMARY KEY ('PlumbersID')
) ENGINE=MyISAM AUTO_INCREMENT=6 DEFAULT CHARSET=latin1 AUTO_INCREMENT=6;
---
Table structure for table 'Real_Estate'
CREATE TABLE 'Real_Estate'
('Real_EstateID' int(6) unsigned NOT NULL auto_increment,
'CID' int(6) default NULL,
'type' varchar(50) default NULL,
'location' varchar(50) default NULL,
'area' varchar(50) default NULL,
'pricerange' varchar(50) default NULL,
'rooms' varchar(50) default NULL,
'cargarage' varchar(50) default NULL,
'pool' varchar(50) default NULL,
'firsttime' varchar(50) default NULL,
'financing' varchar(50) default NULL,
'notes' varchar(250) default NULL,
'dflag' int(4) default '0',
PRIMARY KEY ('Real_EstateID')
) ENGINE=MyISAM DEFAULT CHARSET=latin1 AUTO_INCREMENT=1;
---
Table structure for table 'addbuss'
CREATE TABLE 'addbuss'
('addbussID' int(6) unsigned NOT NULL auto_increment,
'CID' int(6) default NULL,
'bname' varchar(255) default NULL,
'email' varchar(150) default NULL,
'cell' varchar(10) default NULL,
'phone' varchar(10) default NULL,
'address' varchar(255) default NULL,
'country' varchar(50) default '0',
'state' varchar(50) default '0',
'city' varchar(50) default '0',
'street' varchar(50) default '0',
'zip' varchar(11) default '0',
'details' tinytext,
'keword' tinytext,
'url' varchar(255) default NULL,
'logtime' timestamp NOT NULL default CURRENT_TIMESTAMP on update CURRENT_TIMESTAMP,
'dflag' int(4) default '0',
'filter' varchar(4) NOT NULL default 'All',
'map' tinyint(4) NOT NULL default '1',
'chat' mediumtext,
'rating' tinyint(4) NOT NULL default '0',
'video' tinyint(4) NOT NULL default '0',
'image' tinyint(4) NOT NULL default '0',
'dollar' tinyint(4) NOT NULL default '0',
'review' tinyint(4) NOT NULL default '0',
PRIMARY KEY ('addbussID'),
KEY 'CID' ('CID'),
KEY 'phone' ('phone'),
KEY 'country' ('country'),
KEY 'state' ('state'),
KEY 'city' ('city'),
KEY 'street' ('street'),
KEY 'zip' ('zip'),
KEY 'filter' ('filter'),
KEY 'bname' ('bname')
) ENGINE=MyISAM AUTO_INCREMENT=921895 DEFAULT CHARSET=utf8 AUTO_INCREMENT=921895;
---
Example Forms
R2B—Form Creation Sheet
Category Name Aliases
Autos: Vans, Cars, Sedans, Convertible, Coupe, Hybrid, Sport car, SUVs, Trucks
Seller Link: Dealers
Add Buss: Add your Dealership

| Name | Type | List | Default | Example | Notes | DB TYPE/Form Element/Length |
|---|---|---|---|---|---|---|
| Make | Pull Down | 1,Acura<br>2,Alfa Romeo<br>3,Audi<br>4,BMW<br>5,Buick<br>6,Cadillac | | | | VARCHAR/SELECT/50 |

-continued

| Name | Type | List | Default | Example | Notes | DB TYPE/Form Element/Length |
|---|---|---|---|---|---|---|
| | | Etc. | | | | |
| Model | Open | | | (ex: E320, 328i) | | VARCHAR/TEXT/50 |
| New/Used | Pull Down | New/Used/Any | | | | VARCHAR/SELECT/50 |
| Year | Open | | | (ex: 2007-2009) | | VARCHAR/TEXT/50 |
| Color | Open | | | | | VARCHAR/TEXT/50 |
| Options | Open | | | (ex: Sports package) | | VARCHAR/TEXT/50 |
| Price | Open | | | (ex: $20-25k) | | VARCHAR/TEXT/50 |
| Financing | Pull Down | No/Yes/Lease | | | | VARCHAR/SELECT/50 |
| Warranty | Pull Down | Yes/No | | | | VARCHAR/SELECT/50 |
| Notes | Open | | | (ex: Must buy this week) | | VARCHAR/TEXTAREA/250 |

Category Name Aliases
Limos: Airport Limos, Party Limos
Seller: Link Services
Add Buss: Add your Service

| Name | Type | List | Default | Example | Notes | DB TYPE/Form Element/Length |
|---|---|---|---|---|---|---|
| Type of Service | Drop Down | Airport ride<br>Prom<br>Wedding<br>Anniversary<br>Party<br>Other | | | | VARCHAR/SELECT/50 |
| Vehicle Type | Drop Down | No Preference<br>Luxury Sedan<br>Stretch Limo<br>Luxury Party Bus<br>Hummer H2<br>Luxury SUV | | | | VARCHAR/SELECT/50 |
| Number of Passengers | Open | | | | | VARCHAR/TEXT/50 |
| Pick-up Location | Open | | | (ex: SFO Airport) | | VARCHAR/TEXT/50 |
| Drop-off Location | Open | | | (ex: Downtown) | | VARCHAR/TEXT/50 |
| Pick-up Date | Date | | | | | VARCHAR/DATE/50 |
| Pick-up Time | Open | | | (ex: 9:30 am) | | VARCHAR/TEXT/50 |
| Drop-off Date | Date | | | | | VARCHAR/DATE/50 |
| Drop-off Time | Open | | | | | VARCHAR/TEXT/50 |
| Price | Open | | | (ex: $50-$100) | | VARCHAR/TEXT/50 |
| Notes | Open | | | (ex: Want bar and mood lighting) | | VARCHAR/TEXTAREA/250 |

Category Name Aliases
Taxis Cabs, City Cabs
Seller Link: Services
Add Buss: Add your Service

| Name | Type | List | Default | Example | Notes | DB TYPE/Form Element/Length |
|---|---|---|---|---|---|---|
| Number of Passengers | Open | | | | | VARCHAR/TEXT/50 |
| Pick-up Location | Open | | | (ex: Downtown) | | VARCHAR/TEXT/50 |
| Drop-off Location | Open | | | (ex: Hollywood) | | VARCHAR/TEXT/50 |

-continued

| Name | Type | List | Default | Example | Notes | DB TYPE/Form Element/Length |
|---|---|---|---|---|---|---|
| Pick-up Time | Open | | | (ex: 6:30 pm) | | VARCHAR/TEXT/50 |
| Notes | Open | | | (ex: No Vans please) | | VARCHAR/TEXTAREA/250 |

Category Name Aliases                                    10
Flowers Florists
Seller Link: Florists
Add Buss: Add your Business

| Name | Type | List | Default | Example | Notes | DB TYPE/Form Element/Length |
|---|---|---|---|---|---|---|
| Occasion | Drop Down | Birthday Anniversary Love Wedding Get well Sympathy Thank you New Baby Just 'cause | | | | VARCHAR/SELECT/50 |
| Flowers Type | Drop Down | Roses Tulips Lilies Iris Orchids Mixed | | | | VARCHAR/SELECT/50 |
| Price Range | Open | | | (ex: $30-50) | | VARCHAR/TEXT/50 |
| Delivery location | Open | | | (ex: Mission area) | | VARCHAR/TEXT/50 |
| Delivery Date | Calendar | | | | | VARCHAR/DATE/50 |
| Delivery Time | Open | | | (ex: 11 am) | | VARCHAR/TEXT/50 |
| Notes | Open | | | | | VARCHAR/TEXTAREA/250 |

Category Name Aliases
Real-Estate Homes, Condos, Town homes
Seller Link: Realtors
Add Buss: Add your Company

| Name | Type | List | Default | Example | Notes | DB TYPE/Form Element/Length |
|---|---|---|---|---|---|---|
| Property Type | Drop Down | Single Family Home Duplex Town Home Condominium | | | | VARCHAR/SELECT/50 |
| Location | Open | | | (ex: Mission, Lake side, Manhattan) | | VARCHAR/TEXT/50 |
| Area | Open | | | | | VARCHAR/TEXT/50 |
| Price Range | Open | | | | | VARCHAR/TEXT/50 |
| Rooms/Bath | Open | | | (ex: 4 beds, 2 baths) | | VARCHAR/TEXT/50 |
| Car Garage | Drop down | Yes, No, Don't Care | | | | VARCHAR/SELECT/50 |
| Pool | Drop down | Yes, No, Don't Care | | | | VARCHAR/SELECT/50 |
| First Time Buyer | Drop Down | Yes, No | | | | VARCHAR/SELECT/50 |
| Financing | Drop Down | Pre-Qualified Need to Qualify Don't Need | | | | VARCHAR/SELECT/50 |
| Notes | Open | | | (ex: Planning to buy this Summer) | | VARCHAR/TEXTAREA/250 |

Category Name Aliases
Movers Moving
Seller Link: Movers
Add Buss: Add your Service

| Name | Type | List | Default | Example | Notes | DB TYPE/Form Element/Length |
|---|---|---|---|---|---|---|
| Type of Service | Drop Down | House Move Furniture Appliance Piano Big Screen TV Office Move Auto Move | | | | VARCHAR/SELECT/50 |
| Moving From | Open | | | (ex: Glendale) | | VARCHAR/TEXT/50 |
| Moving To | Open | | | (ex: Pasadena) | | VARCHAR/TEXT/50 |
| Storage Required | Pull Down | Yes, No | | | | OPTION |
| Moving Date | Calendar | | | | | VARCHAR/DATE/50 |
| Moving Time | Open | | | (ex: afternoon) | | VARCHAR/TEXTAREA/50 |
| Notes | Open | | | (ex: want an estimate) | | VARCHAR/TEXTAREA/250 |

Category Name Aliases
Doctors Health, Physicians, Medical care
Seller Link: Doctors
Add Buss: Add your Practice

| Name | Type | List | Default | Example | Notes | DB TYPE/Form Element/Length |
|---|---|---|---|---|---|---|
| Specialty | Drop Down | Allergy Cardiology Dermatology Family & General Practice General Surgery Gynecology Internal Medicine Neurology Orthopedic | | | | VARCHAR/SELECT/50 |
| Insurance | Drop Down | Open | | (ex: Blue Cross, Medicare, etc.) | | VARCHAR/SELECT/50 |
| Appointment time | Open | | | (ex: afternoon preferred) | | VARCHAR/TEXT/50 |
| Notes | Open | | | (ex: Have severe headaches) | | VARCHAR/TEXTAREA/250 |

Category Name Aliases
Lawyers Attorneys, Legal
Seller Link: Lawyers
Add Buss: Add your Firm

| Name | Type | List | Default | Example | Notes | DB TYPE/Form Element/Length |
|---|---|---|---|---|---|---|
| Area of Law | Drop Down | Arbitration & Mediation Bankruptcy Civil Rights Civil Service Class Action Litigation Criminal Custody & Support Dui & Traffic Employee & Employer Family | | | | VARCHAR/SELECT/50 |

| Name | Type | List | Default | Example | Notes | DB TYPE/Form Element/Length |
|---|---|---|---|---|---|---|
| | | Immigration & Naturalization Intellectual Property Liable & Slander Real Estate Tort Trial Wills, Estates Trusts & Probate | | | | |
| Case Summary | Open | | | (ex: I want to file patents) | | VARCHAR/TEXTAREA/250 |
| Preferred appointment time | Open | | | (ex: After 5 pm) | | VARCHAR/TEXT/50 |
| Notes | Open | | | (ex: Already filed provisional patents.) | | VARCHAR/TEXTAREA/250 |

Category Name Aliases
Plumbers Air Conditioning, Heating
Seller Link: Plumbers
Add Buss: Add your Service

| Name | Type | List | Default | Example | Notes | DB TYPE/Form Element/Length |
|---|---|---|---|---|---|---|
| Service Required | Drop Down | Drain Clearing, Water Heaters, Faucets and Sinks, Septic Systems, Sprinkler Systems, Pumps, General Maintenance | | | | VARCHAR/SELECT/50 |
| Kind of Service | Drop Down | Repair, Installation | | | | VARCHAR/TEXT/50 |
| Preferred Service Date | Date | | | | | VARCHAR/DATE/50 |
| Preferred Service Time | Open | | | (ex: before noon) | | VARCHAR/TEXT/50 |
| Notes | Open | | | (ex: I want a free estimate) | | VARCHAR/TEXTAREA/250 |

Category Name Aliases
Home Loans Mortgage, Real estate loans, Refinancing, Home equity
Seller Link: Lenders
Add Buss: Add your Company

| Name | Type | List | Default | Example | Notes | DB TYPE/Form Element/Length |
|---|---|---|---|---|---|---|
| Property Type | Drop Down | Single Family Home, Duplex, Town Home, | | | | VARCHAR/SELECT/50 |

-continued

| Name | Type | List | Default | Example | Notes | DB TYPE/Form Element/Length |
|---|---|---|---|---|---|---|
| | | Condo, Apartment, Vacation Home, Other | | | | |
| Home Value | Open | | | | | VARCHAR/TEXT/50 |
| Loan Amount | Open | | | | | VARCHAR/TEXT/50 |
| Loan Type | Pull Down | Purchase, Refinancing, Home Equity | | | | VARCHAR/SELECT/50 |
| Rate Type | Pull Down | Fixed 30 year, Fixed 15 year, Adjustable 3/30, Adjustable 5/30, Adjustable 7/30, Fully Adjustable | | | | VARCHAR/SELECT/50 |
| Down Payment | Open | | | (ex: 10%) | | VARCHAR/TEXT/50 |
| Credit Rating | Drop Down | Excellent, Good, Fair, Bad | | | | VARCHAR/SELECT/50 |
| Yearly Income | Open | | | (ex: 200k) | | VARCHAR/TEXT/50 |
| Monthly Payments | Open | | | (ex: $850) | | VARCHAR/TEXT/50 |
| Residence Type | Pull Down | Primary Home, Second Home, Vacation Home, Rental Property | | | | VARCHAR/SELECT/50 |
| Current Mortgage | Open | | | (ex: first, $350,000, second, $50,000) | | VARCHAR/TEXT/50 |
| Current Rate | Open | | | (ex: 6.5% on first, 7% on second) | | VARCHAR/TEXT/50 |
| Notes | Open | | | (ex: No negative amortization) | | VARCHAR/TEXTAREA/250 |

Further embodiments can be envisioned to one of ordinary skill in the art after reading this disclosure. In other embodiments, combinations or sub-combinations of the above disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. An electronic transaction processing system for coordinating requests for products and/or services from at least one buyer to at least one seller, each of which operate a party client system to interface to the electronic transaction processing system, comprising:
   a database of records of standing requests, wherein standing requests include information regarding products and/or services requested by a buyer, wherein at least two of the standing requests have a product or service category associated with each such standing request, wherein the information stored for a categorized standing request comprises data fields defined by pre-defined parameters, and wherein the data fields for at least two different categories are two different sets of data fields, such that not all standing requests include the same data fields, but have data fields that depend on the standing request's category;
   logic implemented on hardware for receiving over a network a standing request from a buyer;
   logic implemented on hardware for determining whether a seller has agreed to pay to receive a matched standing request;
   logic implemented on hardware for matching the standing request from the buyer to a seller, and
   logic implemented on hardware for the matched seller to receive the matched standing request from the buyer when the matched seller has agreed to pay to receive a matched standing request.

2. The electronic transaction processing system of claim 1, further comprising logic for receiving an approval from the buyer to the response from the matched seller.

3. The electronic transaction processing system of claim 2, further comprising logic for accepting party identification information of the buyer from the buyer client system and party identification information of the seller from the seller client system.

4. The electronic transaction processing system of claim 3, wherein the buyer and seller identities are kept anonymous until the approval is received from the buyer.

5. The electronic transaction processing system of claim 1, wherein the logic for matching the standing request from the buyer to a seller performs the matching based on the category of products and/or services requested.

6. The electronic transaction processing system of claim 1, wherein the logic for matching the standing request from the buyer to a seller performs the matching based on the location of the buyer.

7. The electronic transaction processing system of claim 6, wherein the location of the buyer is determined based on IP address mapping.

8. The electronic transaction processing system of claim 6, wherein the location of the buyer is determined based on the location information from a mobile device.

9. The electronic transaction processing system of claim 1, wherein the party client system presents the buyer with a customized standing request form based on information about the buyer.

10. The electronic transaction processing system of claim 9, wherein the information of the buyer includes past request categories of the buyer.

11. The electronic transaction processing system of claim 9, wherein the information of the buyer includes buyer location information.

12. The electronic transaction processing system of claim 1, wherein the party client system communicates a standing request to the seller based on seller communication interface preferences.

13. The electronic transaction processing system of claim 1, wherein the buyer is automatically notified of the response to a standing request by a matched seller.

14. The electronic transaction processing system of claim 1, wherein more than one seller is matched with a standing request.

* * * * *